United States Patent [19]

Klein

[11] 4,002,473
[45] Jan. 11, 1977

[54] METHOD OF MAKING AN ANODE

[75] Inventor: Gerhart P. Klein, Manchester, Mass.

[73] Assignee: P.R. Mallory & Co. Inc., Indianapolis, Ind.

[22] Filed: Nov. 29, 1973

[21] Appl. No.: 420,140

Related U.S. Application Data

[62] Division of Ser. No. 196,328, Nov. 8, 1971, Pat. No. 3,809,552.

[52] U.S. Cl. .............................. 75/211; 75/208 R; 75/222; 75/200; 264/111; 317/242; 29/25.41
[51] Int. Cl.² .......................................... B22F 1/00
[58] Field of Search ................ 75/200, 208 R, 222, 75/211; 264/111; 317/242; 29/25.41

[56] References Cited

UNITED STATES PATENTS

| | | | |
|---|---|---|---|
| 3,422,515 | 1/1969 | Klein | 75/222 |
| 3,424,952 | 1/1969 | Vierow | 75/200 |
| 3,476,557 | 11/1969 | Fincham | 75/222 |
| 3,627,520 | 12/1971 | Rogers | 75/222 |
| 3,809,552 | 5/1974 | Klein | 75/208 R |

*Primary Examiner*—Benjamin R. Padgett
*Assistant Examiner*—B. Hunt
*Attorney, Agent, or Firm*—Hoffmann, Meyer & Hanson

[57] ABSTRACT

The process for producing anodes on fixtures comprises the following steps. A stringer with risers of film forming metal welded at right angles to the stringer is lowered into row of cavities in an elastomeric mold which have been filled with a slurry including a freezable bonding agent and film-forming metal powder. The risers are centered in the cavities. The powder slurry is frozen with the risers held in registration with the mold pattern. After solidification of the slurry the stringer is withdrawn and the frozen anodes are pulled out of the mold cavities. Predrying preferably with the risers in place prior to freezing removes excess water so that the anodes after thawing will retain their shape and have sufficient strength to withstand the limited handling necessary to transfer them to the sintering equipment. Sintering is preferably done in a horizontal furnace, and preferably special fixtures or a belt to hold the stringer in either horizontal or vertical position so that none of the anodes come in contact with any of the parts of the system while the stringers are carried through the furnace for sintering. The stringers are then removed from the belt for further processing.

9 Claims, 6 Drawing Figures

METHOD OF MAKING AN ANODE

This is a division of application Ser. No. 196,328, filed Nov. 8, 1971, now U.S. Pat. No. 3,809,552.

BACKGROUND OF THE INVENTION

In a U.S. Pat. No. 3,422,515, a method for making porous anodes by freezing wet powder and sintering is described. The result of this process is anodes in the presintered condition without risers. The risers are attached to presintered anodes by welding. Following the welding, the anodes are given a final sintering treatment in vacuum or inert gas atmosphere. After sintering, anodes may be attached to processing bars or stringers by welding.

Even though this process is being used successfully, numerous operations are required to fabricate anodes on stringers from tantalum powder and wire. Besides the casting of anodes from wet tantalum powder slurry in rubber molds and freezing, several steps are required to obtain presintered anodes, attach risers, resinter the anodes with risers, and finally weld the anodes with risers to stringers.

For several reasons it would be most desirable to produce anodes on stringers without the need of two sintering steps and the welding operation. Firstly, handling may introduce mechanical damage and/or contamination in sintered anodes and should be avoided. Best results are obtained if sintered anodes are kept separated from each other and are not allowed to touch any processing fixtures, equipment, or other solid structures that may result in mechanical abrasion or other damage.

Secondly, a welding operation requires a high degree of accuracy in positioning the leads on the anode. Elaborate mechanization is needed for efficient parts handling at this stage.

Thirdly, during final sintering anodes are stacked in crucibles and some degree of sintering between anodes is unavoidable. The resulting inter-anode bonds have to be broken by force which is thought to be harmful to consistent electrical characteristics of finished capacitor devices.

It is an object of the present invention to reduce the number of steps required for the production of capacitor anodes.

It is another object of the present invention to provide an easier method of attaching risers to anodes for capacitors.

It is another object of the invention to reduce the number of sintering steps.

It is another object of the present invention to avoid contact of the anodes with each other and with processing fixtures.

Other objects will be apparent from the following description and drawings wherein.

The process of the present invention helps minimize some or all of the shortcomings of the conventional process of making anodes, and further eliminates the step of welding of anodes to risers, and helps minimize physical contact between anodes from the time they are removed from the mold in a frozen state to the final capacitor.

Anodes thus fixtured can be processed in a variety of ways. Batch processing can be done by combining stringers into processing heads. Linear processing schemes in which rows of anodes pass through subsequent processing stations are particularly attractive for reasons of uniformity of properties, control of profiles of critical process variables (temperature, concentration, etc.) and easy access to individual anodes for in-process control.

SUMMARY OF THE INVENTION

The process for producing anodes comprises the following steps: (i) shaping a mass including film-forming metal powder and a freezable bonding agent around a headed or barbed portion of an anode riser, (ii) freezing the bonding agent to bond powder together around the headed or barbed portion of the anode riser to provide a shaped mass, (iii) sintering the shaped mass to form a rigid body, and (iv) forming a dielectric oxide film of film-forming metal over the powder. More specifically, a stringer with risers of film forming metal welded at right angles to the stringer is lowered into row of cavities in an elastomeric mold which have been filled with a slurry including film forming metal powder and freezable bonding agent such as water. The risers are centered in the cavities. The agent is frozen with the risers held in registration with the mold pattern. After solidification the stringer is withdrawn and the frozen anodes are pulled out of the mold cavities. Pre-drying preferably with the risers in place prior to freezing removes excess freezable bonding agent so that the anodes after thawing will retain their shape and have sufficient strength to withstand the limited handling necessary to transfer them to the sintering equipment. Sintering is preferably done in a horizontal furnace, and preferably special fixtures or a belt hold the stringer in either horizontal or vertical position so that none of the anodes come in contact with any of the parts of the system while the stringers are carried through the furnace for sintering. The stringers are then removed from the belt for further processing.

DETAILED DESCRIPTION

Figure 1:
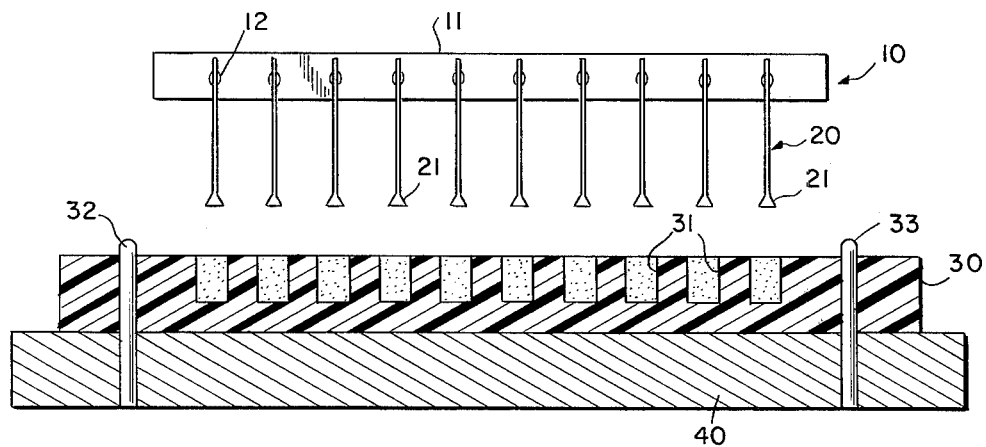
FIG. 1 is a schematic representation of the stringers and risers prior to insertion into the mold.

As can be seen in FIG. 1, stringers 10 with risers 20 attached at right angles are made from film forming metal, including aluminum, tantalum, titanium, and niobium. However, the material is preferably tantalum. The stringer includes a ribbon 11, and the risers 20 are made from wire which preferably includes some kind of barbed hook or head 21 at the free end. The risers 20 are welded to the stringer ribbon 11 as indicated at 12, with accurate predetermined spacing between risers. Typical non-limiting dimensions of the ribbon are: 0.010 inch thick, 0.125 inch wide, 2.0 inches long. Typical risers may have the following (non-limiting) dimensions: diameter 0.020 inch, length 0.3 inch to 0.75 inch, with a head diameter of 0.030 inch. The spacing between risers is at least 0.1 inch center to center.

A shaping means such as rubber mold 30 for anodes is fabricated in a known manner for freezing molded anodes. For example the master pattern may be machined from aluminum or other suitable materials and the mold cast from elastomeric material such as silicone rubber. Mold 30 contains cavities 31 (preferably cylindrical) in a row with approximately the same center to center spacing as the risers on the stringer. The rubber mold contains holes 32 for locating it on base plate 40 by means of guide pins 33.

Mold 30 is placed on base plate 40. Cavities 31 are filled with a freezable bonding agent such as water or other suitable freezable liquid preferably carefully excluding trapped air. This may be done, for example, by submerging the mold in water and forcing a jet of water into the cavities. A washing bottle made from elastomeric material such as polyethylene with the nozzle held beneath the surface of the water is suitable for cavities in a single row. Excess water is removed from the mold, for example with a squeegee.

An excess of tantalum powder slurry is placed on the mold and the powder is allowed to fill the cavities to provide a mass. Excess powder may be scraped off with a hard squeegee.

Figure 2:
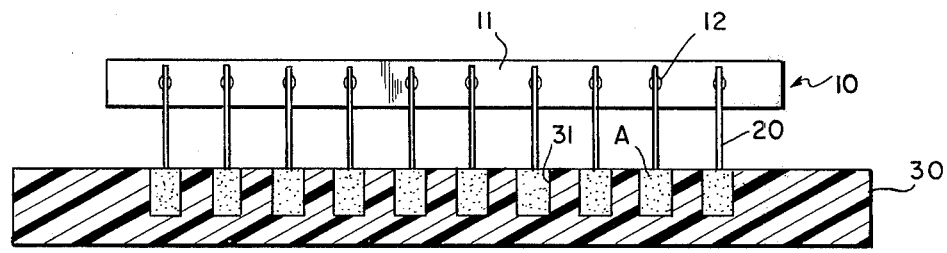
FIG. 2 is a view of another stage of fabrication in the present invention.
Figure 3:
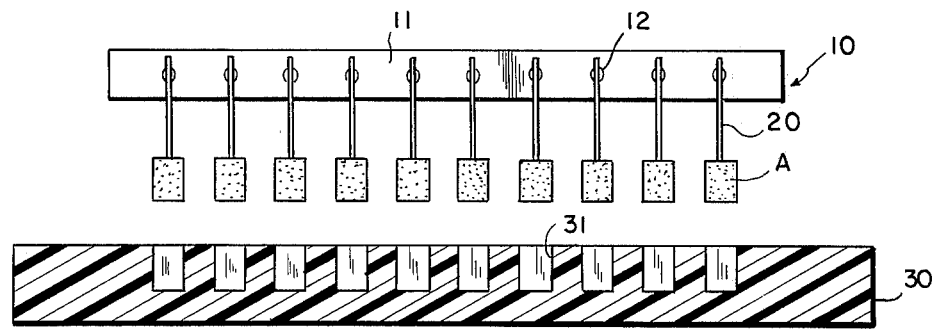
FIG. 3 is a view of the stringer and risers after insertion into the mold cavity.

As shown in FIG. 2, a fixture 50 for holding stringer 10 with risers 20 on guide pins 33 is used to guide risers 20 into cavities 31 filled with powder slurry into the position shown in FIG. 3. The risers with the barbed end 21 preferably extend to the bottom of the cavity in cases where the anode diameter is of the order of the diameter of the riser. If the anode diameter is several times the diameter of the riser then the riser need only extend part way into the anode, as discussed hereinafter.

As in the process described in U.S. Pat. No. 3,422,515 the slurry contains an excess amount of water which often leads to a collapse of the anodes after freezing and thawing outside the mold. For this reason, the watercontent of the slurry is preferably reduced for example from 6–8% to about 4–6%. This is done by drying for example under an infrared lamp, or in a warm air stream. This step is important since too much drying would lead to difficulties on freezing, and subsequent handling, while too little drying would lead to loss of shape and possible falling off risers.

After drying, the whole fixture is placed in a freezer, refrigerator or other system which allows the freezable bonding agent of the slurry in the cavities to freeze solidly to provide a shaped mass. A final temperature of 5° C below freezing is desirable, but it can be anywhere between the freezing point of the freezable bonding agent such as, for example, water, but preferably above the temperature at which the mold material loses its elasticity.

Figure 4:
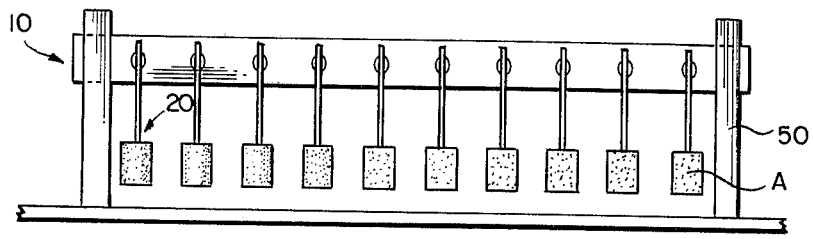
FIGS. 4A and 4B are views of the stringer and risers after anodes have been frozen therein the mold and the risers have been removed from the mold.
Figure 4:
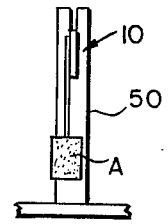
Figure 5:
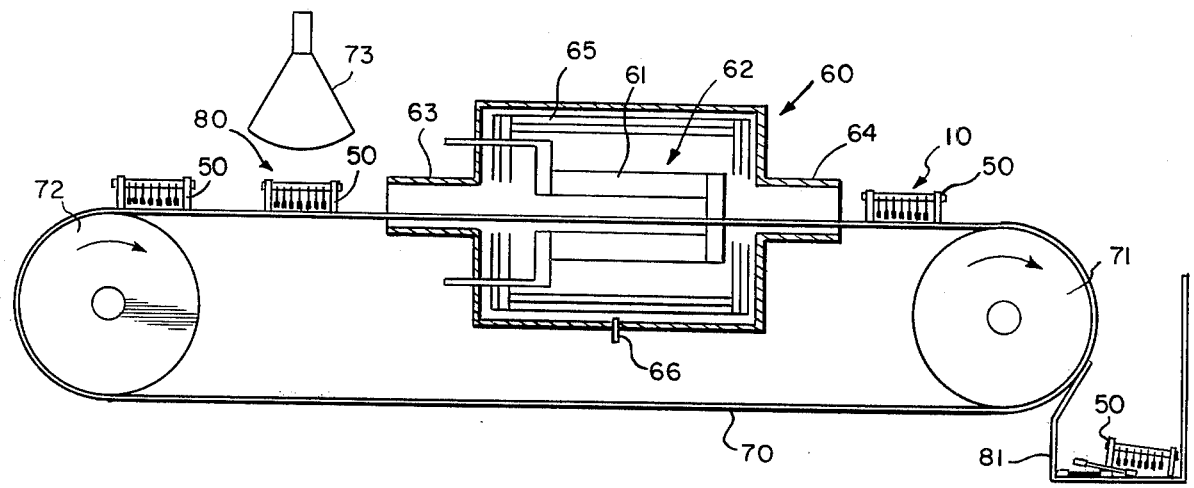
FIG. 5, is a schematic representation of several fabrication steps after the stringers and risers have been removed from the mold.

After the slurry has been frozen, fixture 50 holding the stringer 10 is pulled up and the shaped mass solidly frozen around the risers will be pulled out of the cavities 31 as shown in FIGS. 4A & B. The barbed end 21 (FIG. 1) prevents the risers from being pulled out without the shaped mass or anodes. Extension of the risers to the bottom of the mold in the case of small anodes assures that the anode will come out as a whole. They might otherwise break where the cross section of the frozen mass was reduced by the barbed or headed section of the riser. With larger anodes this is less of a problem. To facilitate removal of larger anodes it may be preferable to use molds with cavities with a slight draft or taper on the walls.

It may be desirable to provide storage between removal from the mold and subsequent sintering of the frozen anodes. They can be stored either while frozen, or in the thawed condition. However because of greater insensitivity to handling the frozen condition is to be preferred. Storage in liquid nitrogen is convenient but may produce some difficulties when the anodes are removed from storage and exposed to the atmosphere. A significant amount of moisture may condense on the anodes and fixture because of the low temperature and this may lead to excess moisture in the anodes and loss of shape as described before. Rapid thawing by exposure to intense infrared radiation may minimize this problem. Otherwise storage at temperature closer to the melting point of the liquid would be more desirable.

The anodes can also be stored in the thawed state as long as drying or additional condensation are prevented. For example, the stringers with anodes can be stored and handled while hanging freely in an atmosphere saturated with moisture. Obviously the stringers must be handled very gently to avoid loss of powder.

The stringers 10 with frozen or moist anodes are transferred to the sintering equipment. For example, a horizontal sintering furnace 60 may be used having inert gas or vacuum. For example, an inert gas such as argon may be introduced through an inlet 66 and exit through furnace extensions 63 and 64. A continuous refractory metal belt 70 driven at constant speed by a suitable power source around wheels 71 and 72 is provided with fixtures 80 to hold individual stringers in either horizontal or vertical position for transport through the hot zone 62 provided by heating elements 61. The stringers must be held in such a way that the anodes A ride freely through the furnace 60 without touching any part of the system. Prior to entering the extension tubes 63 the anodes are dried for example by means of infrared lamps 73. Reflecting structure or insulation 65 may be used to hold the heat in the furnace. Sintering times vary according to the type of film-forming metal powder used, and whether complete or partial sintering is to be effected. In general however, sintering temperature of from about 1500 to about 2200° C may be used. For example, final sintering of 10 micron powder requires 15–30 minutes at 2100° C whereas 4 micron powder requires only 2–10 minutes at this temperature. Presintering alone requires less time, or lower temperature, or both. Typical presintering conditions for example, are 1850°–1950° C for 1–10 minutes to form a rigid body including the anode riser.

If presintering is to be followed by final sintering in conventional batch type furnaces, then the stringers may be placed on racks and treated as conventional anodes are for sintering.

Electro-processing is done following the procedures similar to those used for anodes on risers made by conventional techniques. An anodic oxide layer is formed to contact the anodes according to known techniques. For solid capacitors a solid electrolyte is formed on the oxide, for example, by decomposition of manganese nitrate to form manganese dioxide. The anodes can also be used in wet electrolyte capacitors using known electrolytes such as sulfuric acid. The electrolyte is contacted with a cathode.

What is claimed is:

1. A method of making capacitor anodes comprising providing a mold having cavities therein which have been filled with a slurry of film-forming metal, moving headed or barbed ends of risers made of film-forming metal into the cavities, freezing slurry around ends of the risers while maintaining the ends in the cavities to form shaped masses, removing the shaped masses from the cavities, sintering the shaped masses at an elevated temperature to form rigid bodies, and forming a dielectric oxide over the rigid bodies.

2. A method according to claim 1 wherein said anodes are placed in a container and which an electrolyte is contained therein and which electrolyte engages a portion of the dielectric oxide on said anode and wherein said electrolyte also is in contact with a cathotic portion of said container.

3. A method according to claim 2 wherein said electrolyte is a wet electrolyte.

4. A method according to claim 2 wherein said electrolyte is a solid electrolyte.

5. A method according to claim 4 wherein said electrolyte is manganese dioxide.

6. In a method of making a body suitable for use as an anode in a capacitor, the steps of shaping a mass including film-forming metal powder and a freezable bonding agent around a headed or barbed portion of an anode riser, freezing the bonding agent to bond powder together around the headed or barbed portion of the anode riser to provide a shaped mass, sintering the shaped mass to form a rigid body including the anode riser, and forming a dielectric oxide film of the film-forming metal over the body.

7. The method of claim 6, wherein the film-forming metal powder is selected from the group consisting of Al, Ta, Ti and Nb, wherein the anode riser is of the same material as the powder, and wherein the freezable bonding agent includes water.

8. The method of claim 6, including the further steps of contacting the dielectric oxide film of the body with an electrolyte, and contacting the electrolyte with a cathode.

9. The method of claim 8, wherein the electrolyte is selected from the group consisting of wet and solid electrolytes, and the cathode is a container.

* * * * *